Jan. 19, 1937.  G. H. ACKER  2,068,392
LUBRICATING PUMP
Filed Jan. 9, 1935
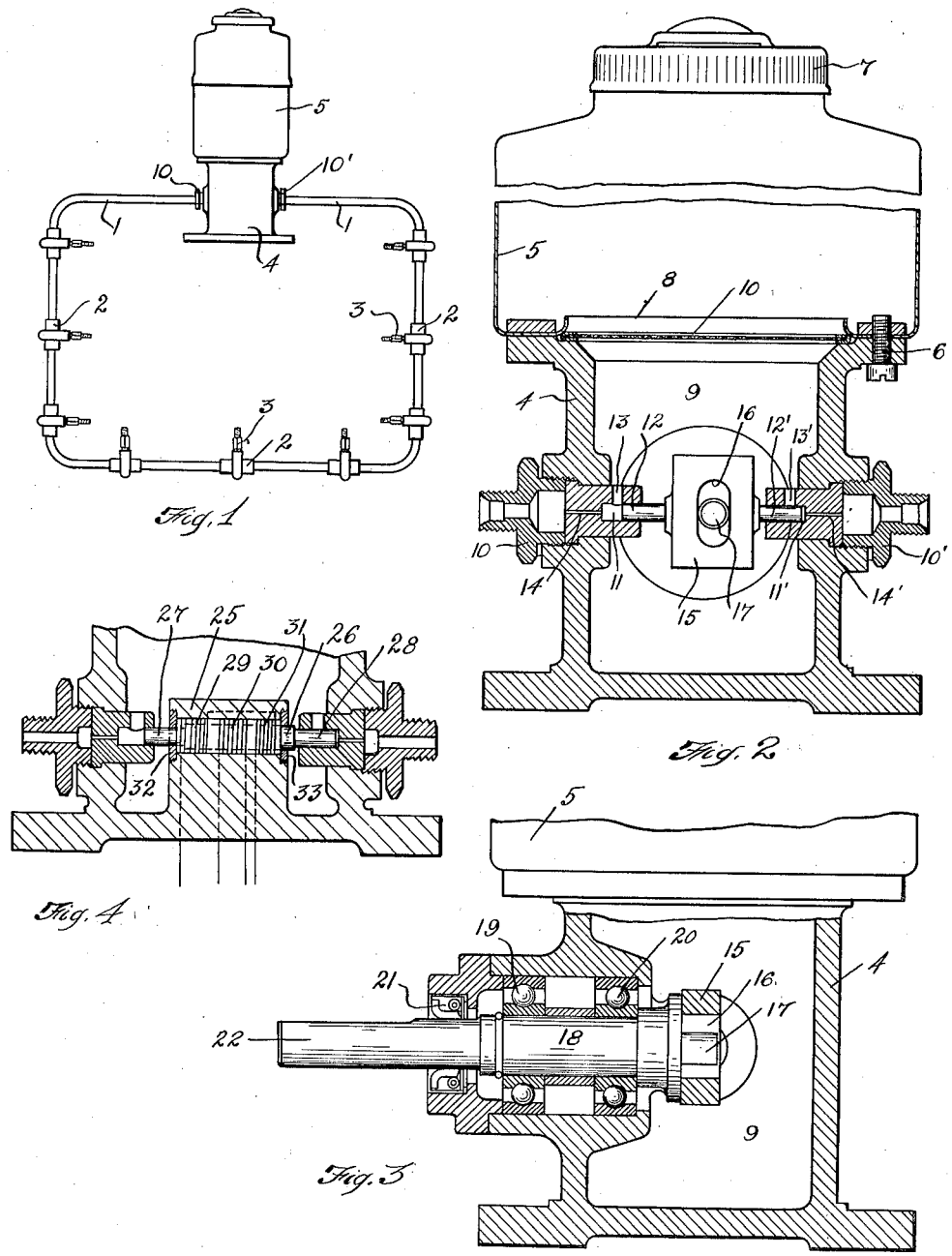
INVENTOR.
George H. Acker
BY
Pray, Oberlin & Pray
ATTORNEYS.

Patented Jan. 19, 1937

2,068,392

UNITED STATES PATENT OFFICE 2,068,392

LUBRICATING PUMP

George H. Acker, Shaker Heights, Ohio, assignor to The Farval Corporation, Cleveland, Ohio, a corporation of Ohio Application January 9, 1935, Serial No. 1,011

7 Claims. (Cl. 184—7)

The present invention relates to a device for supplying lubricant under pressure to a lubricating system.

The general object and nature of the invention is to provide such a lubricant pressure supply means or pump which will contain a minimum of moving parts, which may be manufactured at a substantially low cost, and which will possess certain desired automatic features.

An object of the invention is to provide a pump for a lubricating system which will automatically determine and control the maximum pressure which is attained in the system. Another object is to provide means for automatically relieving the pressure in the system and the supply lines after the desired maximum pressure has been obtained. Still another object is to provide a pump structure of the plunger type wherein additional moving parts such as springs and valves are eliminated, leaving only one moving part in the pump structure proper, namely, the pump plunger or piston. Additional objects and advantages of the invention shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 illustrates the manner of assembly of the lubricant pump embodying the principle of my invention as incorporated in a lubricating system; Fig. 2 is a sectional elevational view of the pump; Fig. 3 is a fragmentary sectional view taken on a plane normal to that of Fig. 2; and Fig. 4 is a fragmentary sectional view illustrating an alternative form of construction of the pump prime moving means.

Lubricating systems of the type to which my present invention is applicable consist essentially of the elements of a supply line, a series of automatic measuring valves connected in the line, and a pump or pressure source for delivering lubricant under pressure to the line and the valves. The lubricant pump embodying my invention is particularly intended for use wherein the operation of the automatic measuring valves which deliver a measured quantity of lubricant to the point or bearing to be lubricated is dependent upon the alternate building up and relief of lubricant pressure in the supply line. Such a measuring valve, for example, is shown and described in Cowles' U. S. Patent No. 1,652,764.

Lubricant pumps which heretofore have been used in such types of lubricating systems wherein the pressure is intermittently applied to and relieved in the system, or "one shot" systems, as they are commonly called in the trade, possess the disadvantage in that a quantity of lubricant which was delivered to the system upon each actuation of the pump was necessarily limited because of the limitation of capacity of a single stroke pump. Furthermore, in order that the pressure generated in a supply line by pumps of the prior art could be relieved, the provision of a relief valve or by-pass was necessary.

In the present invention, however, the quantity of lubricant which is supplied to the system upon a single actuation of the pump is practically unlimited and relief of the pressure in the system automatically occurs when the pump is stopped.

Now referring more particularly to the drawing, there is illustrated in Fig. 1 a typical centralized lubricating system consisting of the supply line 1 in which there is connected a plurality of fittings 2 leading to the automatic measuring valve 3. It will be seen that the supply line 1 makes a complete closed circuit and that each end of the line is connected to the pump 4.

The pump 4 consists of a lower casting or housing on the upper part of which the lubricant tank or container 5 is secured by means of suitable fastening studs 6. The tank 5 is of course replenished with lubricant from time to time by means of removing the closure cap 7. An opening 8 in the bottom of the tank 5 communicates with the interior chamber 9 of the pump housing. A fine mesh screen 10 is interposed between the tank 5 and the chamber 9 for the purpose of separating out any foreign particles which might be occluded in the lubricant. For all intents and purposes, the interior of the tank 5 and the interior chamber 9 constitute a lubricant reservoir.

Each end of the supply line 1 is attached to the pump 4 by means of the fittings 10 and 10'. Between these fittings and the lubricant chamber 9, are located the cylinders 11 and 11'. Pistons 12 and 12' are in turn positioned in the cylinders 11 and 11' respectively. Inlet ports 13 and 13' are located in the side of the cylinders 11 and 11' and communicate with the oil supply or reservoir in the chamber 9. Restricted passages or ports 14 and 14' lead from the head end of the cylinders 11 and 11' to the connecting fittings 10 and 10' of the supply line 1.

The pistons 12 and 12' are connected by means of the block or Scotch yoke 15 in which there is the elongated slot 16. A crank arm or eccentric 17 is positioned in the slot 16 and carried by the end of the shaft 18. The shaft 18 is journaled in the ball bearings 19 and 20 and extends to the exterior of the pump housing 4. A sealing gasket 21 is provided on the shaft 18 in order to prevent lubricant from leaking out along the shaft to the exterior of the pump housing. The outer end 22 of the shaft 18 is connected to a suitable driving motor (not shown).

Rotation of the shaft 18 by the driving motor will thus operate to reciprocate the pistons 12 and 12' in the cylinders 11 and 11'. The cylinder 11 will be filled with lubricant through the port 13 by gravity flow from the chamber 9. As the piston 12 moves on its compression stroke, the port 13 will first be closed and the lubricant in the remaining portion of the cylinder 11 will be forced out through the restricted outlet port 14. The same operation will, of course, occur on the compression stroke of the piston 12' whereby lubricant under pressure will be forced into each end of the supply line 1. On the return or intake stroke of the piston 12, there will first occur a suction tending to draw lubricant back into the cylinder through the restricted outlet port 14. However, due to the fact that the outlet ports 14 are so restricted in dimensions, substantial resistance will be opposed to the return flow of lubricant back into the cylinder 11, and only a slight amount will be returned as compared to the amount which previously has been discharged on the working or compression stroke of the piston 12. When the piston 12 opens the inlet port 13, the cylinder 11 again fills with oil and the cycle of operation is repeated.

It will thus be seen that the outlet port 14 in effect operates as a friction valve. In other words, a substantial pressure of, for example, one thousand pounds per square inch, is generated in the cylinder 11 on the compression stroke of the piston 12. At the beginning of the operation of the pump, there will be only atmospheric pressure exerted upon the outer end of the outlet port 14. Since the velocity of fluid flow through an orifice or passage varies in direct proportion to the square root of the pressure, it will be seen that the difference in pressure between the lubricant at the supply line end of the outlet port 14 and its cylinder end will be effective to transfer lubricant to the supply line more rapidly than it will flow back into the cylinder. However, as the pressure in the supply line gradually increases, the velocity of return flow into the cylinder on the suction or intake stroke of the piston will also increase until a state of balance has been reached, or, in other words, until the quantity of lubricant returned per stroke from the supply line back into the cylinder, is equal to the quantity discharged by the pump piston in the reverse direction. Until such a state of balance is reached, the flow back through the outlet port 14 into the cylinder upon the suction stroke of the piston will not be as great as the discharge flow, since the maximum theoretical pressure tending to draw the lubricant back into the cylinder can never exceed that of a perfect vacuum, viz: about 15 pounds per square inch. On the other hand, the pressure tending to force the lubricant out through the port 14 can reach no theoretical upper limit. Therefore, the outlet port 14 in effect operates as a friction flow valve. Continued operation of the pump will, of course, maintain this balance and maintain a maximum desired pressure in the supply line. There will also be some lubricant flow back through the restricted orifice in the cylinder on the opposite end of the supply line at the time when the first piston 12 comes to the end of its compression stroke. The piston 12' then has opened the inlet 13' next the end of its suction stroke and restricted flow through orifice 14' from the supply line will be possible. But the amount of this flow will be governed by the same principle above explained, and will not equal the amount of flow supplied to the line until the state of the balance is reached. The attainment of pressures over and above that necessary to operate the line valves 2 is possible by reason of the fact that it is practically impossible to completely remove all air and entrapped gases from a lubricant and consequently the lubricant used in the system remains compressible.

Determination of the maximum pressure in the supply line is, of course, dependent upon the viscosity of the lubricant, and the dimensions of the outlet ports 14 and 14'. It will be seen that the cylinders 11 and 11', the inlet ports 13 and 13', and the outlet ports 14 and 14' are made in separate units, and merely by unscrewing the fittings 10 and 10', it is easily possible to install another unit having a different size outlet port.

The length of the pistons 12 and 12' is such that either one of the inlet ports 13 or 13' are at all times partially or completely open. In other words, the distance which the ends of the pistons 12 and 12' extend beyond the edges of the ports 13 and 13' into the head end of the cylinders 11 and 11' is less than the width of the ports. The result achieved by reason of the fact that either one of the ports 13 or 13' are at all times open to the lubricant reservoir is to permit the pressure in the supply line to be relieved back to the lubricant reservoir, after the pump has ceased operation. The pump, of course, is caused to be operated for a sufficient period of time in order to build up the desired or equilibrium supply line pressure and to maintain such pressure for such a time as to insure the permeation of lubricant throughout the supply line with the consequent operation of all of the measuring valves. After such pressure has been reached, maintained, and all of the measuring valves operated, the pump is stopped and the supply line pressure is automatically relieved back to the lubricant reservoir through either one of the ports 13 or 13'.

In the alternative form of construction shown in Fig. 4, an electro-magnetic driving means for the pump pistons has been substituted for the mechanical reciprocating means above described. In the form of construction shown in Fig. 4, a raised boss 25 is located on the bottom of the pump housing 4. The pistons 27 and 28 are joined by an intermediate cylindrical portion 26 which is, of course, composed of a magnetically attracted material and serves as an armature for the electric coils 29, 30 and 31 which are housed in the boss 25. Coils 29 and 31 are connected to alternating current and coil 30 is connected to direct current. Thus, the direct current coil polarizes the armature 26 and the alternating current coils 29 and 31 produce the reciprocation of the armature and the connected pistons 27 and 28. Screw plugs 32 and 33 may be used to retain the electric coils in the housing boss 25.

The operation of the pump elements shown in Fig. 4 will, of course, be identical with those previously described in connection with Fig. 2.

A time clock will, of course, be installed in the electrical circuit of either the driving motor for the construction shown in Fig. 2 or for the solenoid coil shown in Fig. 4. The function of the time clock will be to intermittently actuate the pump whereby pressure in the supply line is built up and relieved at certain predetermined intervals.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a lubricant pump, the combination of a double ended piston, a cylinder on each end of said piston, an inlet port in each cylinder adapted to be opened and closed by the ends of said piston, a restricted outlet port in the outer end of each cylinder, the length of said piston being less than the distance between the outer edges of said inlet ports whereby either one of said ports is always open, and means for reciprocating said piston.

2. In a lubricant pump, the combination of a double ended piston, a cylinder on each end of said piston, an inlet port in each cylinder adapted to be opened and closed by the ends of said piston, a restricted outlet port in the outer end of each cylinder, the length of said piston being less than the distance between the outer edges of said inlet ports whereby either one of said ports is always open, and eccentric means connected to the intermediate portion of said piston for reciprocating the latter.

3. In a lubricant pump, the combination of a double ended piston, a cylinder on each end of said piston, an inlet port in each cylinder adapted to be opened and closed by the ends of said piston, a restricted outlet port in the outer end of each cylinder, the length of said piston being less than the distance between the outer edges of said inlet ports whereby either one of said ports is always open, and electro-magnetic means operable upon the intermediate portion of said piston for reciprocating the latter.

4. In a lubricant pump, the combination of a lubricant reservoir, a supply line connecting a series of measuring valves, a pair of pump cylinders each of which is connected to an opposite end of said supply line, inlet ports in said cylinders communicating with and adapted to receive lubricant from said reservoir, constantly open outlet ports in said cylinder and connecting the latter with said supply line, and pistons reciprocable in each of said cylinders, said outlet ports being of such dimensions as to retard the rate of lubricant flow therethrough.

5. In a lubricant pump, the combination of a lubricant reservoir, a supply line connecting a series of measuring valves, a pair of pump cylinders each of which is connected to an opposite end of said supply line, inlet ports in said cylinders communicating with and adapted to receive lubricant from said reservoir, constantly open outlet ports in said cylinder and connecting the latter with said supply line, and pistons reciprocable in each of said cylinders and adapted to open and close said inlet ports, said pistons being so arranged whereby either one of said inlet ports is open at all times, said outlet ports being of such dimensions as to retard the rate of lubricant flow therethrough.

6. In a lubricant pump, the combination of a lubricant reservoir, a series of measuring valves, a supply line connecting said valves, a double ended piston, cylinders on each end of said piston, said cylinders being respectively connected to opposite ends of said supply line, inlet ports in said cylinders communicating with and adapted to receive lubricant from said reservoir, and constantly open outlet ports in said cylinders and connecting the latter with said supply line, said outlet ports being of such dimensions as to retard the rate of flow therethrough.

7. In a lubricant pump, the combination of a lubricant reservoir, a series of measuring valves, a supply line connecting said valves, a double ended piston, cylinders on each end of said piston, said cylinders being respectively connected to opposite ends of said supply line, inlet ports in said cylinders communicating with and adapted to receive lubricant from said reservoir, the length of said piston being less than the distance between the outer edges of said inlet valves, whereby either one of said inlet ports is open at all times, and constantly open outlet ports in said cylinders and connecting the latter with said supply line, said outlet ports being of such dimensions as to retard the rate of flow therethrough.

GEORGE H. ACKER.